US010212885B2

(12) United States Patent
Mossman

(10) Patent No.: US 10,212,885 B2
(45) Date of Patent: Feb. 26, 2019

(54) FINGER ASSEMBLY FOR A FEED DRUM CONVEYOR OF AN AGRICULTURAL HARVESTING HEAD

(71) Applicant: DEERE & COMPANY, Moline, IL (US)

(72) Inventor: Michael W. Mossman, Silvis, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/297,108

(22) Filed: Oct. 18, 2016

(65) Prior Publication Data
US 2018/0103586 A1 Apr. 19, 2018

(51) Int. Cl.
A01D 34/00 (2006.01)
A01D 65/02 (2006.01)
A01D 34/04 (2006.01)
A01D 41/06 (2006.01)
A01D 41/16 (2006.01)
A01D 61/00 (2006.01)
A01D 101/00 (2006.01)

(52) U.S. Cl.
CPC ............ A01D 65/02 (2013.01); A01D 34/04 (2013.01); A01D 41/06 (2013.01); A01D 41/16 (2013.01); A01D 61/008 (2013.01); A01D 2101/00 (2013.01)

(58) Field of Classification Search
CPC ........ A01D 65/02; A01D 34/04; A01D 41/06; A01D 2101/00; A01D 57/01; A01D 47/00; A01D 57/00; A01D 61/008; A01D 80/02
USPC .............................. 56/312, 313, 364, 400.21
See application file for complete search history.

(56) References Cited

U.S. PATENT DOCUMENTS

| 675,418 | A | * | 6/1901 | Shavland | ...................... 460/113 |
| 2,455,905 | A | | 12/1948 | Ronning et al. | |
| 2,557,226 | A | | 6/1951 | Johnson | |
| 2,644,292 | A | * | 7/1953 | Oberholtz | ............ A01D 89/002 56/14.5 |
| 2,701,634 | A | * | 2/1955 | Carroll | ................. A01D 61/008 198/518 |
| 2,748,921 | A | * | 6/1956 | White | .................. A01D 89/002 198/518 |
| 4,271,956 | A | * | 6/1981 | Hutchinson | ............ B65G 65/22 198/613 |
| 4,574,815 | A | * | 3/1986 | West | ..................... A01F 12/442 460/80 |
| 6,158,571 | A | * | 12/2000 | Gosa | .................... A01D 61/008 198/613 |
| 6,986,241 | B2 | | 1/2006 | Beck | |

(Continued)

FOREIGN PATENT DOCUMENTS

| DE | 1507169 A1 | 12/1969 |
| EP | 3072381 | 9/2016 |
| FR | 2600858 | 1/1988 |

OTHER PUBLICATIONS

EP Search Report for EP Application 17196322.6 dated Feb. 27, 2018.

Primary Examiner — Thomas B Will
Assistant Examiner — Mai T Nguyen
(74) Attorney, Agent, or Firm — Rathe Lindenbaum LLP

(57) ABSTRACT

A finger support for the fingers of a rotating drum conveyor (e.g. feed drum) and agricultural harvesting head includes first and second finger supports with first and second ring portions fixed together to define a gap into which a third ring portion is received and supported.

18 Claims, 5 Drawing Sheets

(56) References Cited

U.S. PATENT DOCUMENTS

| | | | |
|---|---|---|---|
| 7,937,921 B2 * | 5/2011 | Lohrentz | A01D 75/182 56/294 |
| 8,091,327 B2 * | 1/2012 | Batu | A01D 89/002 198/613 |
| 9,392,747 B2 | 7/2016 | Patterson et al. | |
| 9,538,708 B2 * | 1/2017 | Mossman | A01D 57/00 |
| 2006/0252472 A1 * | 11/2006 | Lanzinger | A01D 61/008 460/20 |
| 2009/0056298 A1 * | 3/2009 | Lohrentz | A01D 41/14 56/364 |
| 2014/0237978 A1 * | 8/2014 | Washburn | A01D 61/006 56/181 |

* cited by examiner

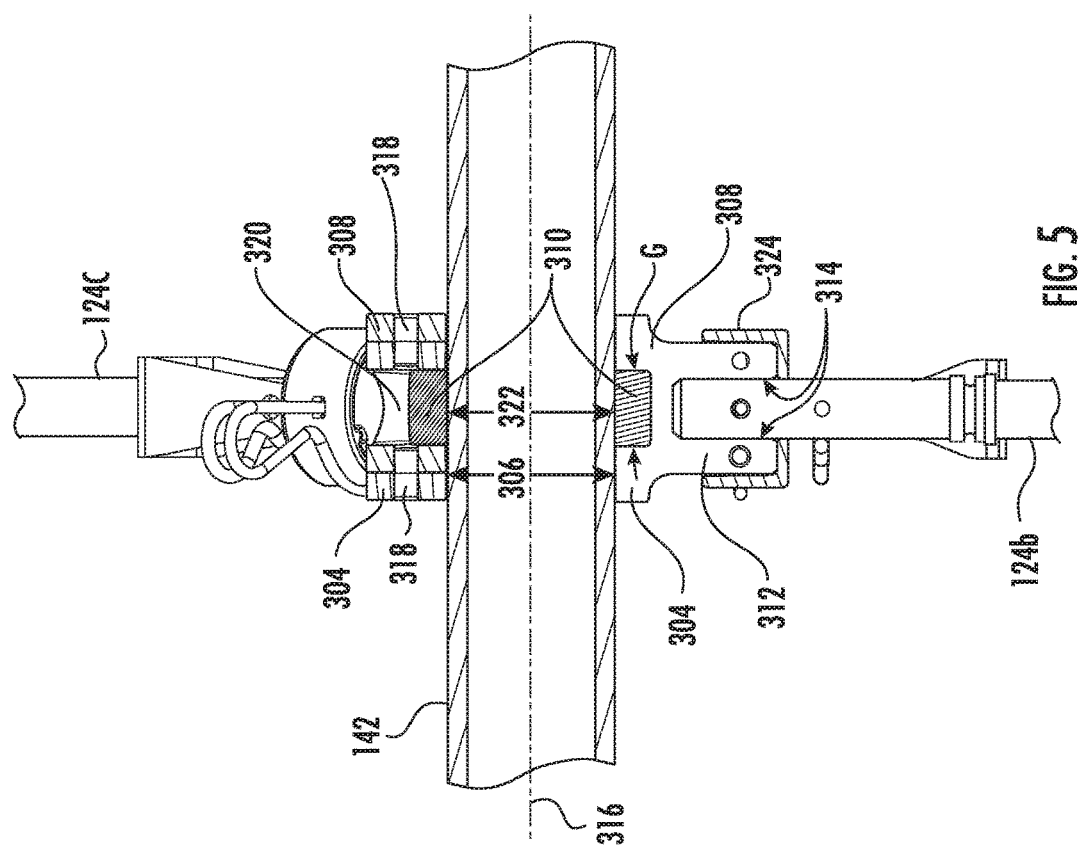

FINGER ASSEMBLY FOR A FEED DRUM CONVEYOR OF AN AGRICULTURAL HARVESTING HEAD

FIELD OF THE INVENTION

This invention relates to agricultural harvesters. More particularly, it relates to agricultural harvesting heads. Even more particularly, it relates to feed drums for agricultural harvesting heads.

BACKGROUND OF THE INVENTION

Agricultural combines gather crop plants from the ground, separate the actual crop from the residue, and then distribute the residue over the ground behind the combine. It is desirable to spread residue evenly over the ground behind the combine, covering the ground that has just been harvested.

Agricultural harvesting heads are supported on the front of the agricultural combines to sever the crop from the ground and feed the severed crop plants into the combine itself. The harvesting heads are typically supported on a conveyor housing (a.k.a. "feeder house" or "inclined elevator") that extends forward from the agricultural combine.

Agricultural harvesting heads such as draper platforms use left and right side conveyor belts to bring the crop inwardly from each side of the head to a central location. The cut crop material is then deposited on a center conveyor belt which feeds the cut crop material rearward, and underneath a feed drum (a type conveyor) supported at the rear of the agricultural harvesting head. The feed drum rotates, and engages the thick mat of cut crop material with fingers that extend from the feed drum.

As the feed drum is driven in rotation, it draws the fingers to the rear of the agricultural harvesting head. The fingers engage the crop mat as they are drawn to the rear and drag the crop mat underneath the feed drum. The fingers withdraw into the feed drum as the drum rotates to the rear, thereby releasing the crop mat and pushing the crop mat into the feeder house. A conveyor in the feeder house then draws the cut crop material upward, to the feeder house and deposits the cut crop material into the combine itself for further processing.

Newer agricultural harvesting heads have a larger crop capacity. As a result, the feed drums must be made with increased conveying capacity. One way to increase the capacity is to increase the dimensions of the feed drum. Another way is to increase the number of fingers extending from the drum to get a better grasp on the mat of cut crop material.

In perhaps the most common arrangement, an offset circular shaft is supported within the drum to which a finger mount is mounted. The finger mount is free to rotate about the circular shaft. A finger is connected to the finger mount at its inner end, and its outer end extends through a hole in the drum. The finger is typically connected to the drum with a quick release device such as a spring clip or pin. The drum is provided with a small removable cover fixed to its outer surface to cover and access hole. To repair a broken or missing finger and/or finger mount, the operator can open this cover, reach inside the drum, and replace the finger/finger mount by unclipping the finger from the finger mount, or and/or releasing the finger mount from the drum. The broken parts can be withdrawn through the access hole, the cover reattached, and the farmer can proceed with harvesting.

Providing each finger with its own individual finger mount limits the number fingers that can be mounted in the feed drum, however, since each individual finger requires its own individual portion of the shaft on which to mount.

It would be beneficial to attach more than one finger to a single finger mount. Indeed, several such arrangements have been investigated in the past.

U.S. Pat. No. 2,748,921 A and U.S. Pat. No. 2,557,226 A show a dual finger mount in the form of a member having an elongate straight slot, to which two diametrically opposed fingers are fixed. The offset circular shaft extends through the elongate slot, and as the drum rotates, translates the shaft up and down in the slot as it simultaneously reciprocates the two fingers fixed to the member back and forth through holes in the wall of the drum. This arrangement produces significant wear as the shaft slides up and down in the elongate slot. Further, the elongate slot is open and collects contaminants which may plug the ends of the slot. Since they are a part of a single rigid member, each pair of diametrically opposed fingers are fixed with respect to each other and do not move relative to each other.

U.S. Pat. No. 9,392,747 shows a dual finger mount similar to U.S. Pat. No. 2,748,921 and U.S. Pat. No. 2,557,226, above. In this arrangement, however, the slot is not straight (see U.S. Pat. No. 2,748,921), but is curved.

DE1507169 A1 shows a multiple finger mount in which rigid bars (1) extend completely through a drum (2) in both directions (each party thus forming 2 fingers that are 180° opposed). Three of these rigid bars (1) are fixed in parallel relation and laterally spaced apart to a longitudinally extending bar (3). The longitudinally extending bar (3) is supported at each end on cam tracks (6). The cam tracks (6) are stationary, whereas the rigid bars and the longitudinally extending bar to which they are fixed is a solid assembly that translates inside the drum and rotates together with the drum. There is no offset shaft fixed within the drum about which the fingers rotate. Further, the two opposing fingers (formed by the two opposing ends of each rigid bar) are fixed with respect to each other, and do not move relative to each other.

U.S. Pat. No. 6,986,241 B2 shows an offset bar in which a row of parallel fingers (16) are attached to an elongate bar (36) that extends parallel to the longitudinal axis of the drum. Bearings (42) are fixed to the elongate bar (36) and are supported on a stationary shaft (32) to rotate about the shaft, thus permitting all of the parallel fingers (16) to rotate together with the drum and simultaneously extend and retract.

In the examples above, the finger mounts supporting multiple fingers are inflexible (i.e. they do not permit the multiple fingers to pivot with respect to each other), and they are long and unwieldy, and difficult to service and replace, It is an object of this invention to provide a feed drum with fingers and finger mounts that avoids or reduces these limitations.

SUMMARY OF THE INVENTION

In accordance with a first aspect of the invention, a finger assembly for mounting on an offset shaft of a feed drum of an agricultural harvesting head comprises: a first finger support including a first ring portion and a second ring portion, wherein both ring portions are configured to be supported and retained on the offset shaft for rotation about the offset shaft, and a first finger mount portion fixed to the first ring portion and the second ring portion and configured to support and retain a first finger; and a second finger support including a third ring portion, wherein the third ring portion is configured to be supported and retained on the offset shaft for rotation about the offset shaft, and second finger mount portion fixed to the third ring portion and configured to support and retain a second finger; wherein the first ring portion and the second ring portion are fixed together and define a gap into which the third ring portion is received and supported.

The finger assembly may further comprise the first finger and the second finger.

The gap may retain the third ring portion yet also may permit the third ring portion to pivot about the axis of the offset shaft with respect to the first ring portion and the second ring portion.

The first finger support may be provided in two halves that are hinged with respect to each other by a hinge such that the first finger support can be opened about the hinge and removed from the offset shaft.

The second finger support may be provided in two halves such that the second finger support can be separated into its halves and thereby removed from the offset shaft.

The first finger support may further include a retainer and fastener arrangement that hold the first finger support to the offset shaft and retain the finger on the first finger support.

The second finger support may further include a retainer and fastener that hold the second finger support to the offset shaft and retain the finger on the second finger support.

The first finger support and the second finger support may be comprised of plastic.

The two halves of the first finger support may be comprised of plastic and the hinge may comprise a steel pin.

Half of the first ring portion and half of the second ring portion may be provided on each half of the first finger support.

Half of the third ring portion may be provided on each half of the second finger support.

The first finger support and the second finger support may be aligned to hold the first finger and the second finger in a common plane that is perpendicular to the longitudinal axis of the offset shaft in all possible rotational positions of the two fingers with respect to the offset shaft.

BRIEF DESCRIPTION OF THE DRAWINGS

FIG. 5 is a cross-sectional view of the finger mount and fingers of FIGS. 3-4 taken through the center line of the stationary shaft and along section line 5-5 of FIG. 3.

DETAILED DESCRIPTION OF THE PREFERRED EMBODIMENTS

Figure 1:
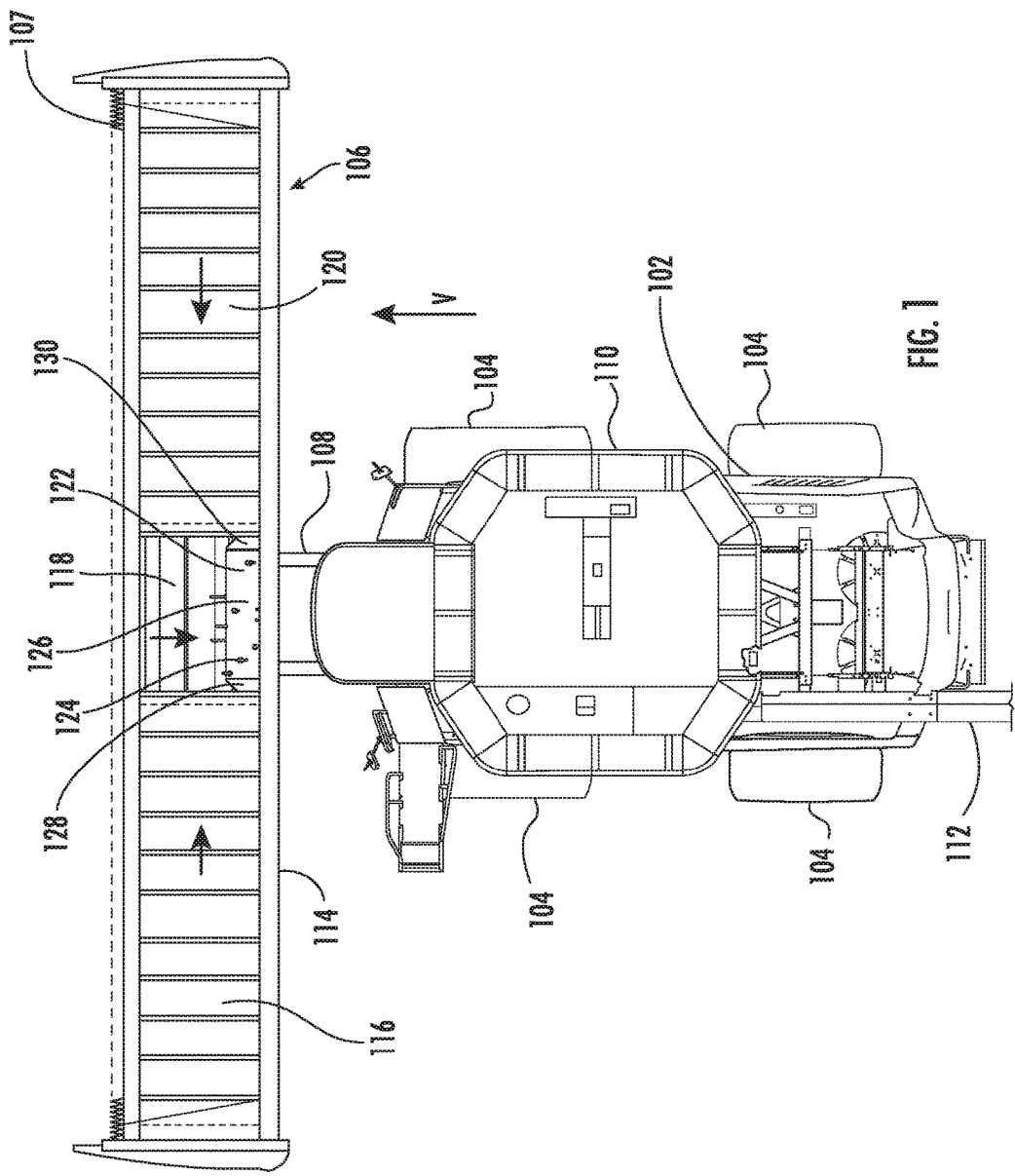
FIG. 1 is a plan view of an agricultural harvesting head in accordance with the present invention.

Referring to FIG. 1, an agricultural combine 100 is configured to travel through an agricultural field harvesting crops. The combine 100 comprises a chassis 102 supported on wheels 104. A harvesting head 106 (shown here is a draper header) is supported on a feeder house 108. The feeder house 108 is supported on the chassis 102.

As the agricultural combine 100 is driven through the field in a direction "V" harvesting crops, a reciprocating knife 107 fixed across the leading edge of the harvesting head 106 severs crop plants adjacent to the ground and conveys them to the feeder house 108. The feeder house 108 has an internal conveyor (not shown) of conventional arrangement that carries the cut crop material upward and into the front of the agricultural combine 100 body. The cut crop material is threshed and separated in the agricultural combine 100, and the grain is further cleaned in the agricultural combine 100 and is deposited in a grain tank 110. An unloading auger 112 receives the clean grain from the grain tank 110 and conveys it to a grain cart or grain wagon that travels alongside the agricultural combine 100.

The agricultural harvesting head 106 includes a frame 114 that extends laterally, generally perpendicular to the direction of travel "V" of the agricultural combine 100. The reciprocating knife 107 severs the crop, which falls on a left side endless belt conveyor 116, a center endless belt conveyor 118, and a right side endless belt conveyor 120.

The endless belt of the left side endless belt conveyor 116 supports the cut crop material and carries it to the right and inwardly towards a central region of the agricultural harvesting head 106 as indicated by the arrow superimposed on the endless belt. The endless belt of the right side endless belt conveyor 120 supports the cut crop material and carries it to the left and inwardly toward the central region of the agricultural harvesting head 106 as indicated by the arrow superimposed on the endless belt. The endless belt of the center endless belt conveyor 118 supports the cut crop material and carries it rearwardly and underneath a feed drum 122 as indicated by the arrow superimposed on the endless belt. Multiple fingers 124 extending from the feed drum stick into and engage the mat of cut crop material carried on the center endless belt conveyor 118. As the feed drum 122 rotates it pulls the fingers 124 underneath the feed drum and rearward toward the feeder house 108. A conveyor (not shown) in the feeder house 108 carries the crop upward and rearward into the body of the agricultural combine 100.

Figure 2:
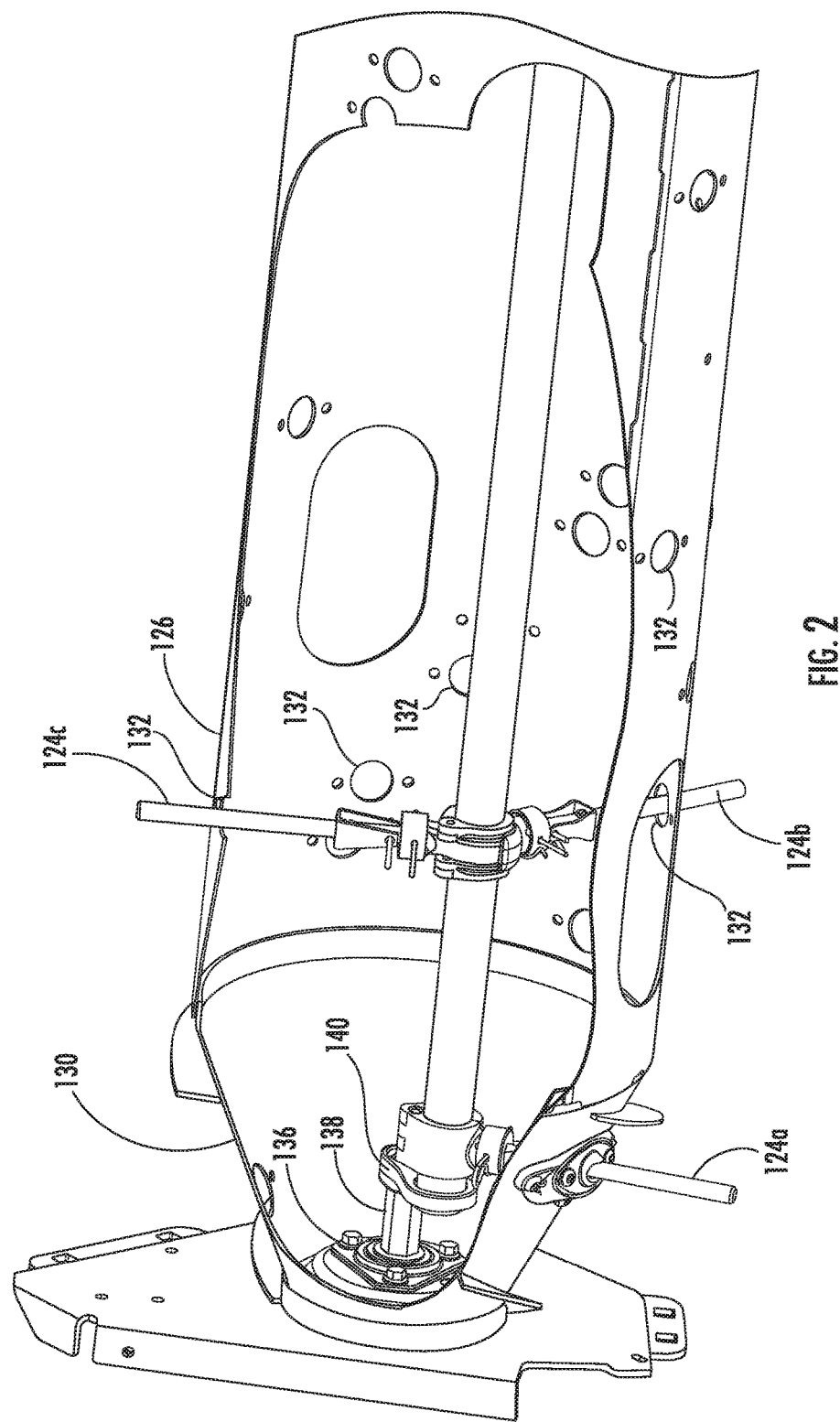
FIG. 2 is a partial cutaway perspective view of the right end of the feed drum of the agricultural harvesting head of FIG. 1.

In FIG. 2, the right end of the feed drum 122 is shown in partial cutaway. The feed drum 122 is symmetric about a plane perpendicular to its longitudinal centerline. Thus the left end of the feed drum 122 is constructed identically as the right. All except two of the fingers and finger mounts have been removed in FIG. 2 for clarity of illustration.

The feed drum 122 has a generally circular cylindrical center section 126 to which truncated cones 128, 130 are attached at opposite ends of the center section 126. The center section 126 is defined by a cylindrical wall that has a plurality of holes 132 extending therethrough. The fingers 124 are supported in these holes and are rotated by the feed drum 122 as it rotates about its longitudinal axis.

The feed drum is supported on bearings 136 at each end of the feed drum 122. Two hexagonal stub shafts 138 are fixed at their outer ends outside the feed drum 122. These shafts extend into the feed drum through the bearings 136. The shafts 138 are stationary and do not rotate. A cantilevered arm 140 is fixed to the inside end of each stub shaft 138. These cantilevered arms extend forward inside the feed drum 122 from the stub shaft 138 and (like the stub shaft 138) are stationary and fixed with respect to the drum as the drum is driven in rotation. A drive motor (not shown) is coupled to the left end (not shown) of the feed drum and drives the feed drum in rotation. An offset shaft 142 extends parallel to the stub shafts 138 and parallel to the axis of rotation of the feed drum. The offset shaft 142 is located inside the feed drum and is coupled to the forward ends of cantilevered arms 140.

A finger assembly 144 is supported on the offset shaft 142. The finger assembly 144 includes mounts for two fingers and the fingers 124 (shown here as 124a, 124b, 124c) that are fixed to the mounts and extend outward at their outer ends through holes 132 in the wall of the feed drum 122.

As the feed drum 122 is driven in rotation, the stub shafts 138, the cantilevered arms 140, and the offset shaft 142 are stationary. The holes 132 in the feed drum 122 push against the side of the fingers 124 and cause the fingers 124 and the finger mounts 146 (to which the fingers are attached) to rotate about the offset shaft 142.

Figure 3:
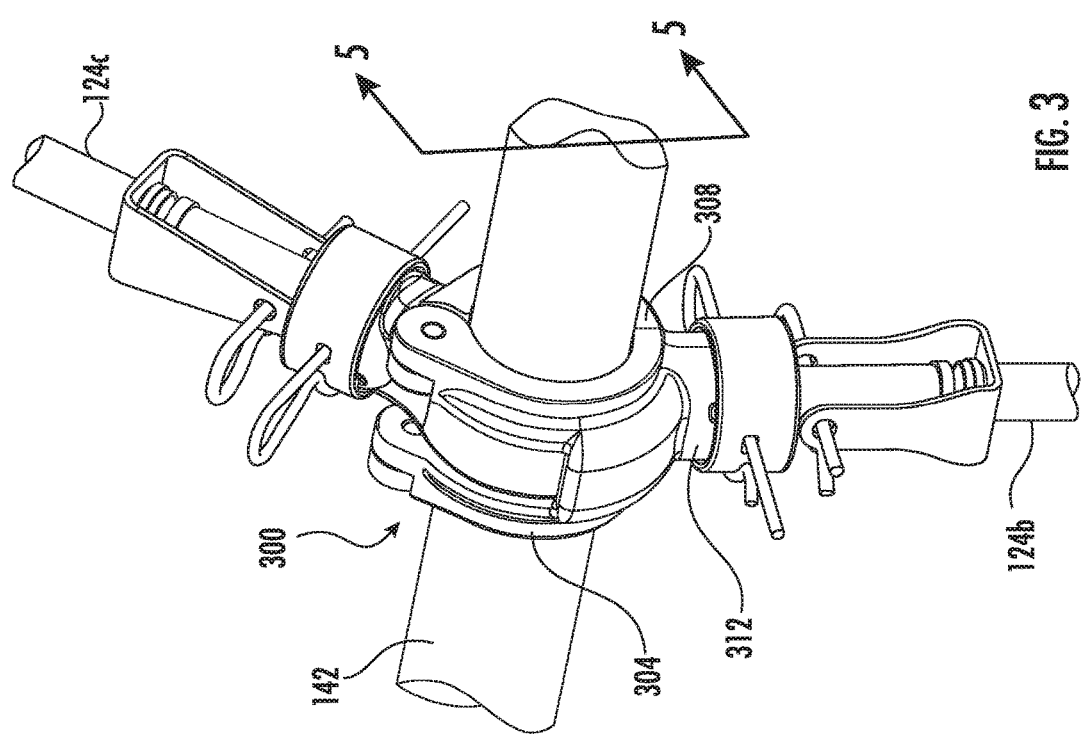
FIG. 3 is fragmentary detail view of a finger mount and fingers located inside the feed drum of FIG. 2.
Figure 4:
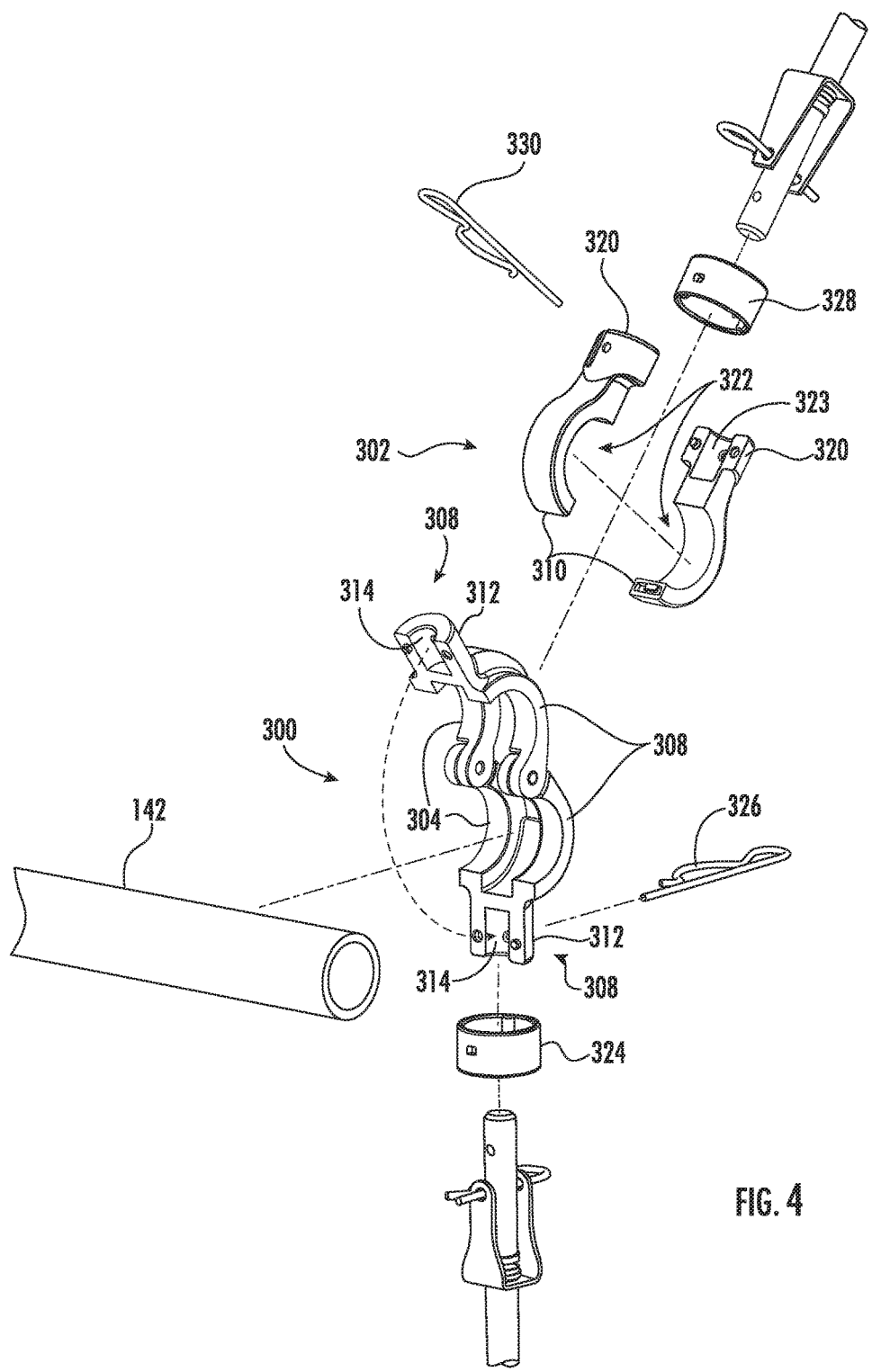
FIG. 4 is an exploded view of the finger mount and fingers of FIG. 3.

Referring to FIG. 3-5, the finger assembly 144 comprises a first finger support 300, and a second finger support 302. The first finger support 300 supports finger 124b for rotation around the offset shaft 142. The second finger support 302 supports finger 124c for rotation around the offset shaft 142.

The first finger support 300 has a first ring portion 304 that extends around the offset shaft 142 and a second ring portion 308 that also extends around the offset shaft 142.

The first ring portion 304 and the second ring portion 308 are fixed together, side-by-side in a spaced-apart relation to provide a gap "G" therebetween into which a ring portion 310 of the second finger support 302 is fitted. The first ring portion 304 and the second ring portion 308 define a circular and cylindrical aperture 306 that is the same size as the offset shaft 142. The aperture 306 of is sized sufficiently to permit the first finger support 300 to rotate freely about the offset shaft 142 with a small clearance.

The first finger support 300 has a finger mount portion 312 that is integrally formed with the first ring portion 304 and the second ring portion 308. The finger mount portion 312 is generally cylindrical and defines a circular and cylindrical aperture 314. The aperture 314 has a longitudinal axis that extends perpendicular to the longitudinal axis 316 of the offset shaft 142. The aperture 314 is substantially the same as the outer diameter of the finger 124b. By this arrangement, the first finger support 300 supports the finger 124b for rotation about the offset shaft 142 and also holds the finger perpendicular to the offset shaft 142.

The first finger support 300 is provided in two halves that are hinged together at a hinge 318. The hinge 318 is positioned on the opposite side of the offset shaft 142 as the finger mount portion 312. The hinge 318 includes a steel pin that extends through it relieved holes in the two halves of the first finger support 300. One half of the first ring portion 304, one half of the second ring portion 308, and one half of the finger mount portion 312 are provided on each half of the first finger support 300. The hinge permits the first finger support 300 to be opened and wrapped around the offset shaft 142. This permits the finger support 300 and the finger 124b to be removed from the offset shaft without requiring the offset shaft to be unbolted and removed from the feed drum 122.

The second finger support 302, like the first finger support 300, has a ring portion 310 that defines an aperture 322. The aperture 322 is sized to extend around the offset shaft 142 and be supported on the offset shaft 142 for rotation about the offset shaft 142.

The second finger support 302, like the first finger support 300, has a finger mount portion 320. Like the first finger support 300, the finger mount portion 320 is generally cylindrical and defines a circular aperture 323 into which finger 124c is inserted. The finger mount portion 320 and the aperture 322 also extend perpendicular to the offset shaft 142. This arrangement ensures that the finger 124b is held perpendicular to the offset shaft 142 and is free to rotate about the offset shaft 142.

The ring portion 310 is positioned in the gap "G" between the first ring portion 304 and the second ring portion 308. The first ring portion 304 and the second ring portion 308 straddle the ring portion 310, abutting the ring portion 310 on both sides of the ring portion 310 but permitting the ring portion 310 to pivot about offset shaft 142 with respect to the first ring portion 304 and the second ring portion 308.

This arrangement also permits the finger 124b to pivot with respect to the finger 124c as both fingers rotate about the offset shaft 142. This arrangement permits both the fingers to change their relative angular orientation as they are rotated around the offset shaft 142 by the feed drum 122. This change in relative angular orientation is necessary since the fingers are mounted on a shaft that is offset within the feed drum 122, and therefore the feed drum 122 as it rotates will change the angular orientation between the two fingers. This arrangement permits both of the fingers to lie in the same perpendicular plane of the offset shaft and thus provide a more compact finger arrangement with a greater number of fingers than was previously possible. Having additional fingers, more closely spaced, permits the feed drum 122 and fingers 124 to grab the crop mat and pull it with greater strength.

The second finger support 302, like the first finger support 300, is provided in two halves, each half having one half of the ring portion 310 of the second finger support 302 and half of the finger mount portion 320. Unlike the first finger support 300, these two halves are not hinged together. Instead, they are fitted into the gap "G" between the first ring portion 304 and the second ring portion 308.

The two halves of the first finger support 300 are held in a closed position around the offset shaft 142 by a retainer 324. The retainer 324 is a generally cylindrical ring that is installed around the two halves of the finger mount portion 312 when the two halves of the finger mount portion 312 are wrapped around the offset shaft 142 and held together. The retainer 324 is retained on the first finger support with a fastener 326, such as a nut, bolt, screw, pin, or spring pin (as illustrated herein).

The spring pin 326 passes through aligned holes in the finger mount portion 312 as well as a hole in the finger 124b. In this manner, the spring pin 326 retains the two halves of the first finger support 300 together and attaches the finger 124b to the first finger support 300 as well.

Likewise the two halves of the second finger support 302 are held in a close position around the offset shaft 142 by retainer 328. The retainer 328 is a generally cylindrical ring that is installed around the two halves of the finger mount portion 320 when the two halves are wrapped around the offset shaft 142 and held together. The retainer 328 is retained on the first finger support the fastener 330, such as a nut, bolt, screw, pin, or spring pin (as illustrated herein).

The spring pin 330 passes through aligned holes in the finger mount portion 320 as well as a hole in the finger 124c. In this manner, the spring pin 330 retains the two halves of the second finger support 302 together and attaches the finger 124c to the second finger support as well.

The device described above is provided to illustrate the invention. The invention, however, is defined by the claims below, and is not limited to the particular device illustrated and described herein.

The invention claimed is:

1. A finger assembly for mounting on an offset shaft of a feed drum of an agricultural harvesting head comprises:

a first finger support including a first ring portion and a second ring portion, wherein both ring portions are configured to be supported and retained on the offset shaft for rotation about the offset shaft, and a first finger mount portion fixed to the first ring portion and the second ring portion and configured to support and retain a first finger; and a second finger support including a third ring portion, wherein the third ring portion is configured to be supported and retained on the offset shaft for rotation about the offset shaft, and second finger mount portion fixed to the third ring portion and configured to support and retain a second finger;

wherein the first ring portion and the second ring portion are fixed together and define a gap ("G") into which the third ring portion is received and supported, wherein the first ring portion comprises:
 a first ring half;
 a second ring half joined to the first ring half by a first hinge;

wherein the second ring portion comprises:
 a third ring half;
 a fourth ring half joined to the third ring half by a second hinge coaxial with the first hinge and spaced from the first hinge by the gap;

wherein the first finger mount portion comprises:
 a first finger mount half connecting the first ring half and the third ring half; and
 a second finger mount half connecting the second ring half and the third ring half, wherein the first finger mount half and the second finger mount half cooperate to form a first aperture therebetween for receiving a first finger, wherein the third ring portion extends through the gap between the first hinge and the second hinge, the third ring portion comprising:
 a fifth ring half;
 a sixth ring half cooperating with the fifth ring half to form an aperture to receive the offset shaft, wherein the fifth ring half and the sixth ring half are not hinged together;

wherein the second finger mount portion comprises:
 a third finger mount half extending from the fifth ring half;
 a fourth finger mount half extending from the sixth ring half, wherein the third finger mount half and the fourth finger mount half cooperate to form a second aperture therebetween for receiving a second finger.

2. The finger assembly of claim 1 further comprising the first finger and the second finger.

3. The finger assembly of claim 1 wherein the gap ("G") retains the third ring portion yet also permits the third ring portion to pivot about the axis of the offset shaft with respect to the first ring portion and the second ring portion.

4. The finger assembly of claim 2, wherein the first finger support further includes a retainer and fastener arrangement that hold the first finger support to the offset shaft and retain the finger on the first finger support.

5. The finger assembly of claim 1, wherein the second finger support further includes a retainer and fastener that hold the second finger support to the offset shaft and retain the finger on the second finger support.

6. The finger assembly of claim 1 wherein the first finger support and the second finger support are comprised of plastic.

7. The finger assembly of claim 5, wherein the two halves of the first finger support are comprised of plastic and wherein the hinge comprises a steel pin.

8. The finger assembly of claim 4, wherein half of the first ring portion and half of the second ring portion are provided on each half of the first finger support.

9. The finger assembly of claim 5, wherein half of the third ring portion is provided on each half of the second finger support.

10. The finger assembly of claim 2, wherein the first finger support and the second finger support are aligned to hold the first finger and the second finger in a common plane that is perpendicular to the longitudinal axis of the offset shaft in all possible rotational positions of the two fingers with respect to the offset shaft.

11. The finger assembly of claim 1 further comprising:
 a retainer ring encircling the first finger mount half and the second finger mount half; and
 a pin passing through the first finger mount half, through the second finger mount half, through the first finger and through opposite sides of the retainer ring.

12. The finger assembly of claim 11 further comprising:
 a second retainer ring encircling the third finger mount half and the second finger mount half; and
 a second pin passing through the third finger mount half, through the fourth finger mount half, through the second finger and through opposite sides of the second retainer ring.

13. The finger assembly of claim 12 further comprising:
 a first curved web portion spanning between the first ring half and the third ring half, between the first finger mount half and the first and second hinges; and
 a second curved web portion spanning the second ring half and the fourth ring half, between the second finger mount half and the first and second hinges, wherein the first curved web portion and the second curved web portion partially enclose the second finger mount portion such that the second mount portion is to be sandwiched between the first curved web portion and the offset shaft and sandwiched between the second curved web portion and the offset shaft.

14. A finger assembly for mounting on an offset shaft of a feed drum of an agricultural harvesting head, the finger assembly comprising:
 a first ring portion comprising:
  a first ring half;
  a second ring half joined to the first ring half by a first hinge;
 a second ring portion comprising:
  a third ring half;
  a fourth ring half joined to the third ring half by a second hinge coaxial with the first hinge and spaced from the first hinge by a gap;
 a first finger mount half connecting the first ring half and the third ring half;
 a second finger mount half connecting the second ring half and the third ring half, wherein the first finger mount half and the second finger mount half cooperate to form a first aperture therebetween for receiving a first finger;
 a third ring portion extending through the gap between the first hinge and the second hinge, the third ring portion comprising:

a fifth ring half;
a sixth ring half cooperating with the fifth ring half to form an aperture to receive the offset shaft, wherein the fifth ring half and the sixth ring half are not hinged together; and
a third finger mount half extending from the fifth ring half;
a second finger mount half extending from the sixth ring half, wherein the third finger mount half and the fourth finger mount half cooperate to form a second therebetween for receiving a second finger.

15. The finger assembly of claim 14 further comprising the first finger and the second finger.

16. The finger assembly of claim 15 further comprising:
a retainer ring encircling the first finger mount half and the second finger mount half; and
a pin passing through the first finger mount half, through the second finger mount half, through the first finger and through opposite sides of the retainer ring.

17. The finger assembly of claim 16 further comprising:
a second retainer ring encircling the third finger mount half and the second finger mount half; and
a second pin passing through the third finger mount half, through the fourth finger mount half, through the second finger and through opposite sides of the second retainer ring.

18. The finger assembly of claim 17 further comprising:
a first curved web portion spanning between the first ring half and the third ring half, between the first finger mount half and the first and second hinges; and
a second curved web portion spanning the second ring half and the fourth ring half, between the second finger mount half and the first and second hinges, wherein the first curved web portion and the second curved web portion partially enclose the second finger mount portion such that the second mount portion is to be sandwiched between the first curved web portion and the offset shaft and sandwiched between the second curved web portion and the offset shaft.

* * * * *